J. A. BRIED.
CONSTRUCTION OF PULLEY AND FRICTION WHEEL LAGGING.
APPLICATION FILED JULY 28, 1919.
1,391,238. Patented Sept. 20, 1921.
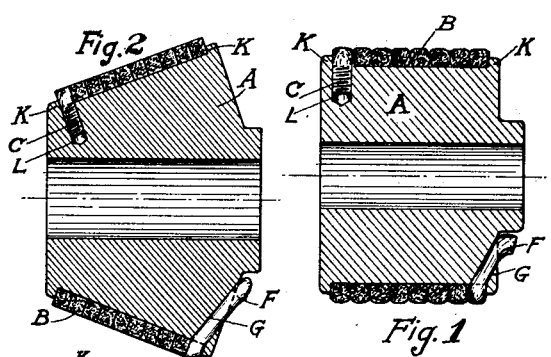
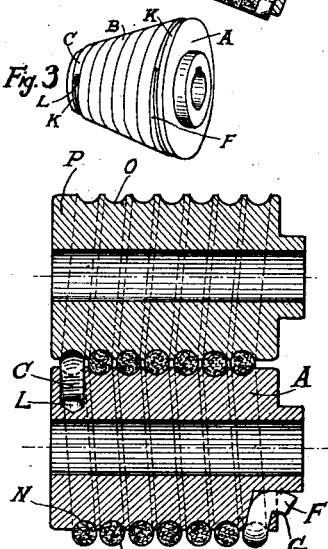
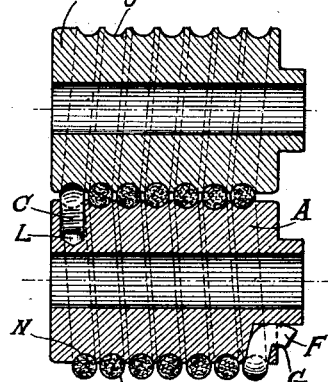
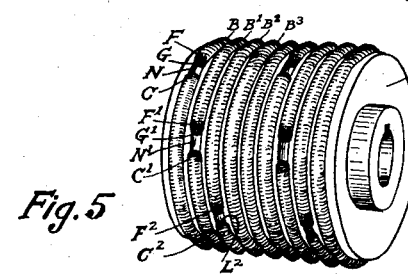
INVENTOR.
Julien C. W. Bried

UNITED STATES PATENT OFFICE.

JULIEN A. BRIED, OF OAKLAND, CALIFORNIA, ASSIGNOR OF ONE-HALF TO SAMUEL L. ROGERS, OF SAN FRANCISCO, CALIFORNIA.

CONSTRUCTION OF PULLEY AND FRICTION-WHEEL LAGGING.

1,391,238.

Specification of Letters Patent. Patented Sept. 20, 1921.

Application filed July 28, 1919. Serial No. 313,860.

*To all whom it may concern:*

Be it known that I, JULIEN A. BRIED, a citizen of the United States, residing at Oakland, in the county of Alameda and State of California, have invented a new and useful Improvement in the Construction of Pulley and Friction - Wheel Lagging, of which the following is a specification and which is illustrated in the accompanying drawings.

This invention relates to improvements in the method of covering or lagging of motor pulleys, friction wheels, and the like, with leather, canvas, or rubber, etc., and has for its principal object an easily produced lagged pulley or wheel, the lagging of which will not become loosened in operation of the wheel, but will constantly tend to tighten up due to the frictional drag of belts or the frictional pull and rolling action of other wheels operating against it.

In the drawings accompanying this application Figure 1 shows in cross section, a wheel covered or "lagged" by my improved, self-tightening wrapping, using a covering material of round cross section.

Fig. 2 shows in cross section, a conical friction wheel covered by the same method, but with a square form, covering material.

Fig. 3 is a perspective view of a similar wheel to that shown in Fig. 2, but with a different arrangement of the final end of the wrapping material.

Fig. 4 shows in end section, a portion of a wheel rim with an automatic clamp to prevent a return movement of the free end of the wrapping.

Fig. 5 is a perspective view of a wheel having multiple, parallel grooves, each provided with a "free to creep" wrapping in accordance with my invention.

Fig. 6 is a cross section of a wheel with a single spiral groove across its face containing one of my improved wrappings and shown rolling in contact with a grooved mating wheel.

Fig. 7 is a perspective view of a similar wheel, but with multiple right and left grooves, each containing an individual wrapping in accordance with my invention, and the wheel is shown in contact with a mating wheel grooved to correspond.

In further detail, and in which all reference letters in the various views denote features of my invention having like functions, Fig. 1 is a sectional view of my lagging applied to a pulley or spur friction wheel A, low flanges or retaining edges K are formed on the wheel to hold the lagging from shifting. A round section leather lagging strip B is used in this example, the starting end C being screwed tightly into a threaded hole L, and the final end of the coil F being simply pulled through an easy fitting hole G. The flanges K are shown of lesser height than the lagging but may be of the same height or higher if desired.

Fig. 2 is a sectional view of a bevel friction wheel of similar construction to the wheel shown in Fig. 1, but in this case a leather strip B of square section is used for the wrapping, the starting or fastened end C being rounded and screwed tightly in the threaded hole L in the wheel A.

Fig. 3 shows a helically wound bevel friction wheel or pinion of the same cross section as the wheel shown in Fig. 2, except that the free end F of the lagging B is not secured at all except by friction, being tapered off as shown and wedged in tightly between the last lap of the lagging and the retaining edge K. It will not be displaced in operation of the wheel even at high rotative speeds, and is free to creep and constantly wedge itself more tightly in place, as actual use has demonstrated. The helical wrapping may be of double or triple lead if desired, or right and left hand coils with the free ends wedged between the coils in the center.

Fig. 4 shows a simple automatic clamp for holding the loose end of the lagging when my lagging is applied to a pulley with a rim or wheel large enough to accommodate it, and consists of a flat spring plate R held in place against the inside of the pulley A, by the bolt S. The free end of the spring R is sharpened at T to impinge upon the loose end F of the lagging B after the same has been passed through the loose hole G. The creep of the lagging coils will thus automatically be taken up by the action of the spring clamp which permits the lagging to be pushed past it but prevents it from pulling or working back. If desired this or a similar device may be used on both ends of the lagging, thus permitting the pulley or wheel to be revolved in either direction and the slack to be taken up automatically at either end.

Fig. 5 shows a still further modification, a round leather belt lagging in a multiple grooved wheel A, these grooves N, N¹, etc., however, not being helical but placed side by side, each having a separate piece of round lagging B, B¹, B², etc., fastened to the wheel only at their starting ends C, C¹, C², etc., in the holes L, L¹, L², etc., and the final ends of each piece, F, F¹, F², etc. being inserted in the easily fitting holes G, G¹, etc., to permit the lagging to creep into said holes when elongating in operation. This wheel is adapted to mate either with a plain faced wheel under frictional contact, or in contact with a wheel grooved to correspond, this latter giving a higher power transmitting capacity with equal pressure. The wheel A if used as the driver must be rotated in a direction to cause constant tightening of the lagging strips by forcing the slack in a direction away from the secured ends.

Fig. 6 is a sectional view showing a still further modification of the invention wherein a lagging B of round section is secured to the wheel A, at one end C; as previously described; in a single helical groove N formed in the wheel A, and with its other end held but free to creep as previously described, and is adapted to roll in contact with a corresponding helical groove O formed in a mating wheel P. This construction gives greatly increased traction over a plain faced wheel, though the wheel may be used with a plain mating wheel if desired, as it is essentially no different than the wheel shown in Fig. 1, except that the helical groove in the wheel insures an even spacing to the helical lagging strip.

Fig. 7 shows a pair of multiple helical grooved wheels of the same construction described in the preceding paragraph, but formed with right and left hand helices of much greater angle, best constructed out of right and left halves joined at Q. The lagging B, of each groove of the wheel A is separately fastened to the wheel tightly at one end and pushed into a hole at the other end, as previously described, and, while it may be operated against a plain faced mating wheel, it is particularly adapted to roll in contact with a right and left multiple grooved mating wheel P, in which the mating grooves are lettered O. Any groove and its lagging would have the same cross section as a groove and lagging shown in Fig. 6. As the drawing Fig. 7 clearly shows many separate grooves on the wheel A, consecutive lettering of them has not been attempted.

This adaptation of my invention, while essentially no different from two of the wheels shown in Fig. 1, wound right and left hand and operating together on a common shaft, forms when running with the multiple grooved wheel P, a positive cushioned drive gear set operating under very low bearing pressure as compared to common friction gears.

In using the word "helical" in the specification and claims it is intended to mean coils that are not wrapped upon each other or overlapping as are true "spiral" coils, though in the case of bevel friction wheels as shown in Figs. 2 and 3, or with wheels of even greater angularity "helical" wrappings gradually become volute or spiral in form, but these are intended to be embraced in my use of the word "helical" herein.

I claim:—

1. On a friction wheel, a strip lagging of friction material adapted to automatically tighten itself upon the wheel through rolling pressure of use.

2. A pulley or wheel lagged on its rim surface with a strip of lagging material, with an end of said strip secured to the pulley and the remainder free to creep and tighten itself against the pulley through the rolling pressure of use.

3. A pulley or wheel lagged on its rim surface with a strip of lagging material, with one end of said strip secured to the pulley and the other end free to creep in direction of lengthening the strip.

4. A pulley or wheel wrapped about its rim surface in a helical manner with a strip of lagging material, one end of said strip secured to the pulley and the other end free to creep in direction of lengthening the strip.

5. A friction wheel or pulley with a strip of friction material wrapped around the face of its rim, and means operative against an end of said strip for automatically taking up any slack developed in the wrapping upon the operation of said pulley.

6. A friction wheel or pulley with a strip of friction material wrapped in a helical manner around the face of its rim and means operative against an end of said strip for automatically taking up any slack developed in the wrapping upon the operation of said pulley.

7. A friction wheel construction comprising a flanged wheel, a strip of friction material wrapped around said wheel in a helical manner, one end of said strip secured to the wheel and the other end held in place by friction, with freedom to creep in direction of lengthening the strip.

8. A friction wheel construction comprising a flanged wheel, a strip of friction material wrapped around said wheel in a helical manner, one end of said strip secured to the wheel and the other end held in place by friction between the flange of the wheel and the last lap of the wrapping.

9. A wheel, a groove around said wheel, a strip of resilient material in said groove and projecting therefrom, one end of said strip fastened to the wheel and the other end free to creep in direction of lengthening the strip.

10. A wheel, a threaded hole in said wheel, a strip of friction material screwed at one end into said hole and wrapped about the face of the wheel with its final end held to the wheel by friction.

11. A wheel, a threaded hole in said wheel, a strip of friction material screwed at one end into said hole and wrapped helically about the face of said wheel with its final end wedged between the last coil of the wrapping and a portion of said wheel.

JULIEN A. BRIED.

Witnesses:
 MARGARET E. C. BRIED,
 M. D. NICHOLS.